United States Patent [19]
Lee et al.

[11] Patent Number: 5,959,708
[45] Date of Patent: Sep. 28, 1999

[54] LIQUID CRYSTAL DISPLAY HAVING A CONDUCTIVE HIGH MOLECULAR FILM FOR PREVENTING THE FRINGE FIELD IN THE IN-PLANE SWITCHING MODE

[75] Inventors: Seung-Hee Lee; Hyang-Yul Kim; Bong-Gyu Roh; Deuk-Su Lee; Han-Jun Park, all of Kyoungki-do, Rep. of Korea

[73] Assignee: Hyundai Electronics Industries Co., Ltd., Ich'on, Rep. of Korea

[21] Appl. No.: 08/878,809

[22] Filed: Jun. 19, 1997

[30] Foreign Application Priority Data

Jun. 21, 1996 [KR] Rep. of Korea ............... 96-22854
Nov. 29, 1996 [KR] Rep. of Korea ............... 96-59508

[51] Int. Cl.⁶ .................................................. G02F 1/1343

[52] U.S. Cl. .......................... 349/143; 349/122; 349/141

[58] Field of Search ................... 349/141, 143, 349/122, 123

[56] References Cited

U.S. PATENT DOCUMENTS

| | | | |
|---|---|---|---|
| 4,922,242 | 5/1990 | Parker | 345/106 |
| 5,422,194 | 6/1995 | Satoh et al. | 428/704 |
| 5,689,320 | 11/1997 | Okada et al. | 349/135 |
| 5,734,451 | 3/1998 | Yanagawa et al. | 349/43 |
| 5,754,266 | 5/1998 | Ohta et al. | 349/139 |
| 5,815,230 | 9/1998 | Miura et al. | 349/129 |
| 5,844,644 | 12/1998 | Oh et al. | 349/95 |

*Primary Examiner*—William L. Sikes
*Assistant Examiner*—Heidi L. Eisenhut
*Attorney, Agent, or Firm*—Ware, Fressola, Van Der Sluys & Adolphson LLP

[57] ABSTRACT

Disclosed is a liquid crystal display device having a pixel electrode and a counter electrode formed on one substrate device. The device includes: a first transparent substrate having a conductive high molecular film formed on the pixel electrode and the counter electrode; a second transparent substrate arranged parallel to the first transparent substrate; and a liquid crystal material disposed between the first and second transparent substrates, for selectively scattering or transmitting light in response to a prescribed input.

27 Claims, 4 Drawing Sheets

LIQUID CRYSTAL DISPLAY HAVING A CONDUCTIVE HIGH MOLECULAR FILM FOR PREVENTING THE FRINGE FIELD IN THE IN-PLANE SWITCHING MODE

BACKGROUND OF THE INVENTION

1. Field of the Invention

The present invention relates to a method of producing a liquid crystal display device, and more particularly to a liquid crystal display device(hereinafter simply referred to as "LCD") and a fabrication method thereof having a pixel electrode and a counter electrode formed on one substrate device.

2. Description of the Prior Art

Generally, a LCD device of a television or a graphic display includes a pair of transparent glass substrates and a liquid crystal disposed between the glass substrates which include an upper glass substrate and a lower glass substrate. A thin film transistor and a pixel electrode are formed on the lower glass substrate, and a color filter and a counter electrode are formed on the upper glass substrate.

Recently, among LCD devices, a twist nematic mode LCD has been widely used. In the twist nematic mode LCD, there are, however, serious problems regarding the viewing-angle characteristics related to large display area.

Therefore, in order to offer a broad view to the user, an "in plane switching mode" (hereinafter simply referred to as "IPS mode") LCD using a horizontal electric field has been developed. FIG. 1 is a sectional view of a conventional IPS mode LCD.

Referring to FIG. 1, a black matrix 2, is formed on an upper glass substrate 1, and is for improving contrast ratio by preventing light leakage of a thin film transistor formed on a lower glass substrate 5. Color filters 3, for providing the conventional IPS mode LCD with a color display, are then formed at both sides of the black matrix 2. Thereafter, a protective film 4 is formed on the black matrix 2 and the color filters 3.

In order to realize the horizontal electric field on the lower glass substrate 5, a counter electrode 7 and a gate electrode 6A are formed on the lower glass substrate 5. The counter electrode 7 is positioned in line with the gate electrode 6A apart from each other at a predetermined distance. Material used for the gate electrode 6A and the material used for the counter electrode 7 are the same. After forming the gate electrode 6A and the counter electrode 7, a gate insulating film 6B is formed on the gate electrode 6A and the counter electrode 7. A channel layer 6C of amorphous silicon is then formed on a predetermined portion of the gate insulating film 6B at which the gate electrode 6A is formed. Thereafter, a metal film for the wiring of data electrodes is formed on the total structure. A pattern for a source electrode and a pattern for a drain electrode are then formed. At this time, a drain electrode 6D is formed not separately but together with a pixel electrode during the formation step of the pixel electrode, the drain electrode 6D being simply a line extended from a corresponding pixel electrode at a region corresponding to the drain electrode. In addition, the source electrode 6E is formed not separately but together with a data line during the formation step of the data line, the source electrode 6E being only a part of a data line.

A protective film 8 for protecting the thin film transistor and the pixel electrode, and an alignment film are then formed on the total structure. Thereafter, the upper glass substrate 1 and the lower glass substrate 5 are attached to each other. Polarizers 10 and 11 are then respectively attached to the outer surfaces of the upper glass substrate 1 and the lower glass substrate 5. A liquid crystal material (not shown) having a negative dielectric anisotropy($-\Delta\epsilon$) is inserted and then sealed between the upper glass substrate 1 and the lower glass substrate 5.

If an electric voltage is applied to the IPS mode LCD having the structure as described above, a horizontal electric field is generated. In other words, since the pixel electrode 6D and the counter electrode 7 are positioned on the lower glass substrate 5, a horizontal electric field which is parallel to the plane of the substrate is created. When the electric field is applied to the pixel electrode 6D and the counter electrode 7, LC molecules having negative optical dielectric anisotropy($-\Delta\epsilon$) are arranged perpendicular to the direction of the electric field. In other words, the molecules are arranged at an angle of 45° from the direction of polarization of an incident light as indicated by the arrow of FIG. 2. Consequently, LCD operates in a bright mode.

FIG. 2 is a plan view of a lower glass substrate illustrated in FIG. 1.

Referring to FIG. 2, a gate line 6A is arranged in a horizontal line. At a portion of the gate line 6A, a data line 6E and the gate line 6A perpendicularly cross each other. A thin film transistor 6 is formed at the crossed portion of the gate line 6A and the data line 6E. The counter electrode 7 has a quadrilateral band shape for defining a unit cell in a space which is created by the data line 6E and the gate line 6A. The pixel electrode 6D has a I-shape with a portion thereof overlapping a portion of the gate line 6A and a portion of the counter electrode 7.

In the conventional IPS mode LCD having the foregoing structure, however, the horizontal electric field has two components: a straight electric field component having electric power lines parallel to the plane of substrate, created between the data line and the counter electrode; and a curved fringe field component F (shown in FIG. 1) having curved electric power lines, created at fringe regions of the data electrode and the counter electrode. The straight electric field component affects a directional orientation of liquid crystal molecules near the lower substrate 1 at an angle of 45°, when applying an electric power to the counter electrode and the pixel electrode. The curved fringe field component, however, affects directional orientation of the liquid crystal molecules which are further away from the lower substrate such that these liquid crystal molecules are directionally oriented at an angle of less than 45°. The result is a decrease in transmittance of incident light. In order to compensate for the decrease in light transmittance, the brightness of the back light must be enhanced. Consequently, consumption of electric power is highly increased.

SUMMARY OF THE INVENTION

The present invention is provided to solve the foregoing problems. It is an object of the present invention to provide a liquid crystal display device and a method of fabricating the same capable of reducing a consumption of electric power and having an enhanced light transmittance, by forming conductive high molecular film patterns on a pixel electrode and a counter electrode respectively, to exclude directional orientation of liquid crystal molecules due to a fringe field.

According to the present invention, a liquid crystal display device where a counter electrode and a pixel electrode are formed on a transparent substrate, includes: a first transparent substrate having a conductive high molecular film formed on the pixel electrode and the counter electrode; a second transparent substrate arranged parallel to the first transparent substrate; and a liquid crystal material inserted between the first and second transparent substrates, for selectively scattering or transmitting light in response to a prescribed input.

The conductive high molecular film makes it possible a for liquid crystal molecules that are further away from the first substrate to be directionally oriented at 45° from optical polarization direction of incident light. Preferably, the high molecular film has a thickness of 1,000 Å to 10 µm, which is equal to or less than a cell gap.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, the preferred embodiment of the present invention will be explained in more detail with reference to the accompanying drawings.

Figure 3:
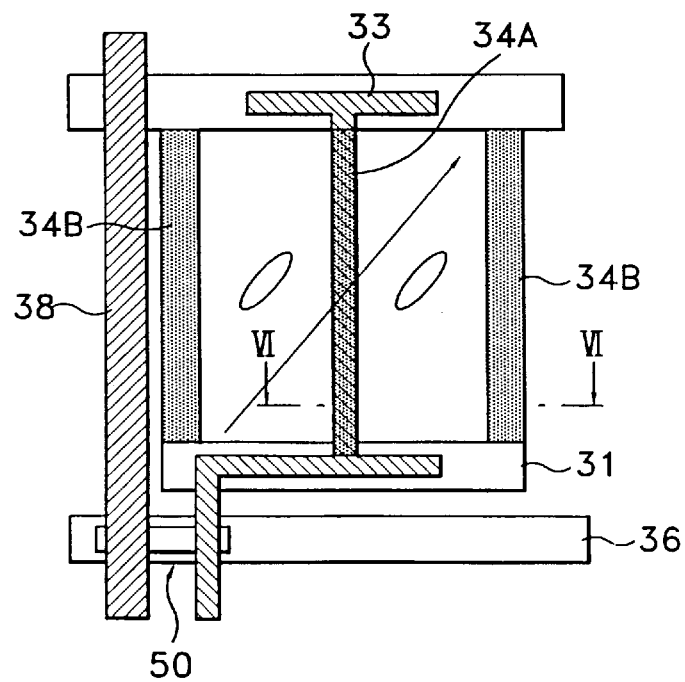
FIG. 3 is a plan view of a lower glass substrate illustrated according to the present invention.
Figure 4:
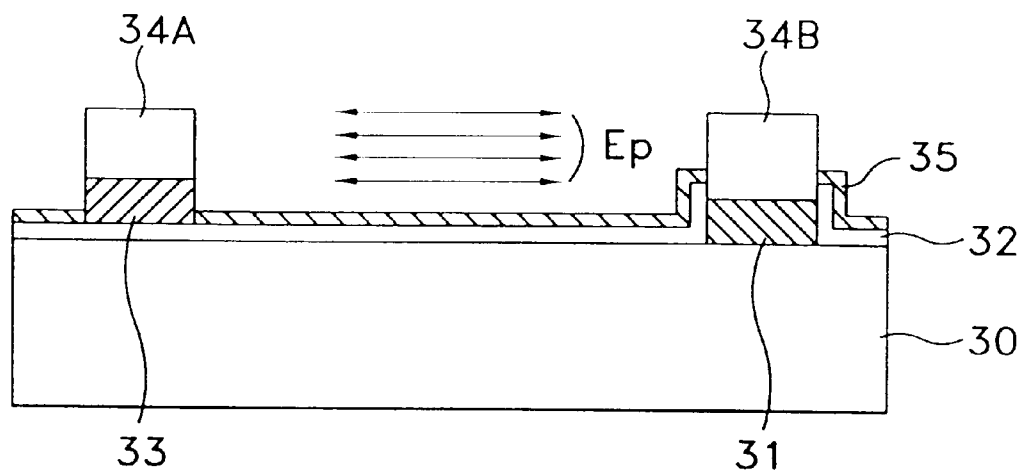
FIG. 4 is a sectional view taken along line VI—VI of FIG. 3 according to a first embodiment of the present invention.

FIG. 3 is a plan view of a lower glass substrate illustrated according to the present invention and FIG. 4 is a sectional view taken along line VI—VI of FIG. 3 according to a first embodiment of the present invention.

Figure 1:
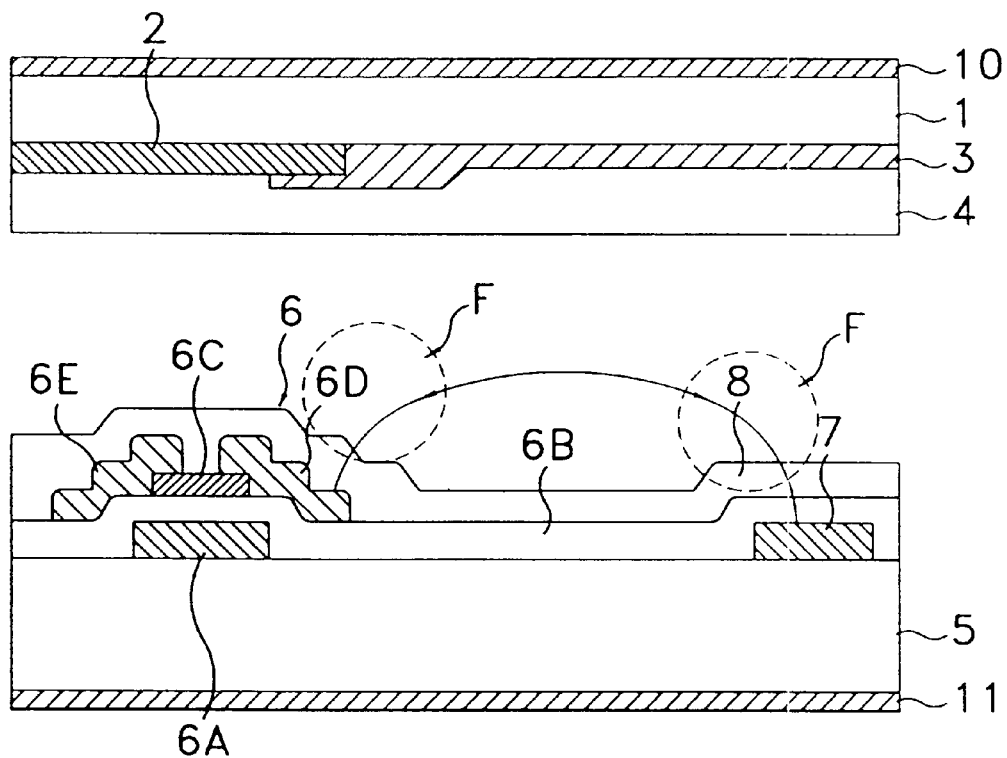
FIG. 1 is a sectional view of a conventional IPS mode LCD.
Figure 2:
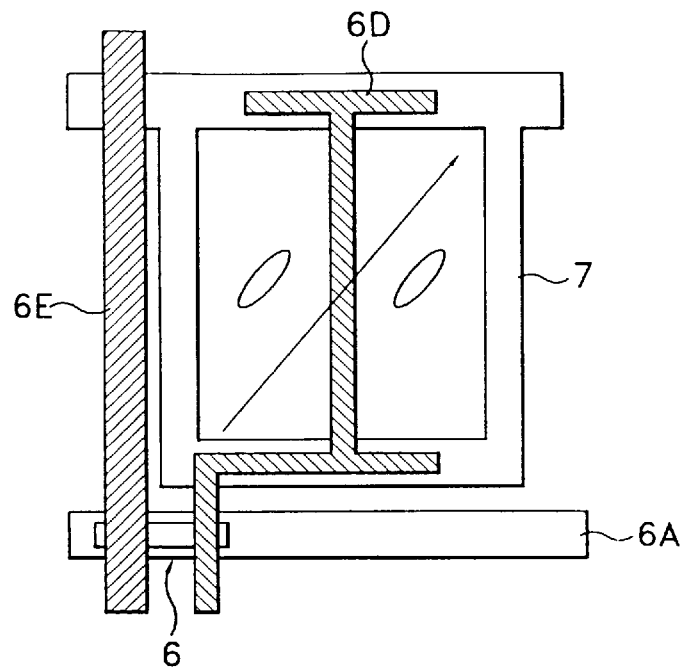
FIG. 2 is a plan view of a lower glass substrate illustrated in FIG. 1.

The LCD device of the present invention has the same structure as that of the conventional art of FIG. 1 except that it has an improved lower glass substrate 30. In addition, liquid crystal material to be applied, has a negative dielectric anisotropy.

Referring to FIG. 3, a gate line 36, a data line 38, an I-shape pixel electrode 33, a counter electrode 31, a transistor 50 for driving the pixel electrode 33, and an alignment layer 35 (not shown) are formed on the lower glass substrate 30 (not shown in this figure). Conductive high molecular film patterns 34A, 34B are provided on a pixel electrode 33 and a counter electrode 31 of the lower glass substrate 30, respectively. The conductive high molecular film has a thickness range equal to or less than the cell gap. Preferably, the thickness range is about 1,000 Å to 10 µm. The conductive high molecular film is formed by the chemical synthesis of a material selected from a group consisting of polyacetylene, polyaniline, p-phenylene, polypyrrole, polythiophene and p-phenylenevinylene. The electric conductivity of the conductive high molecular film is determined by the synthesis technique and doping material used for the synthesis process. The electric conductivity of the high molecular film is higher than the electric conductivity of the metal used for the pixel electrode and the counter electrode by one order.

When electrical power is applied to the pixel electrode 33 and the counter electrode 31, the electric field generated by the pixel electrode 33, the counter electrode 31, and the conductive high molecule films 34A & 34B that are formed on the pixel electrode 33 and the counter electrode 31 respectively, has a straight component Ep as shown in FIG. 4. The component Ep is proportional to the height of the conductive high molecular films 34A & 34B such that it controls not only alignment of liquid crystal molecules near the lower substrate 30 but alignment of all liquid crystal molecules in the cell gap. Thus, all the liquid crystal molecules are directionally aligned at 45° from the direction of optical polarization. In other words, the alignment of all liquid crystal molecules depends not on the fringe field component but on the straight electric field component Ep, so that liquid crystal molecules located further away from the lower substrate 30 are also aligned by 45° from the optical polarization direction. Accordingly, the shortcoming of increased consumption power found in the conventional LCD device is avoided.

Meanwhile, referring to FIG. 4, two methods can be applied in the fabrication of IPS mode LCD having the above-mentioned conductive high molecular film. According to a first method, the counter electrode 31 is first formed on the lower glass substrate 30, and the conductive high molecular film 34B is then formed on the counter electrode 31. Afterwards, a gate insulating layer 32 is formed on the whole surface including the counter electrode 31 and the conductive high molecular film 34b. Thereafter, processes for forming a channel layer and a pixel electrode pattern are sequentially performed. Afterwards, the conductive high molecular film 34A is formed on the pixel electrode pattern 33. Thereafter, the gate insulating layer 32 on the portion of the conductive high molecular film 34B, is removed. Lastly, an alignment layer 35 is formed on the whole surface except the conductive high molecular film patterns 34A and 34B. According to a second method, a counter electrode pattern 31 and a gate insulating layer 32 are first formed on a lower glass substrate 31. After a process for forming a pixel electrode 33 pattern has been performed, the gate insulating layer 32 on the counter electrode 31 is then etched. Afterwards, conductive high molecular film patterns 34A and 34B are formed on the pixel electrode 33 and the counter electrode 31. Lastly, an alignment layer 35 is formed on the whole surface except the conductive high molecular film patterns 34A and 34B.

The foregoing conductive high molecular film patterns 34A and 34B are formed by coating the conductive high molecular film on the whole surface of the substrate and then patterning the coated film.

The following methods can be applied in the formation of the high molecular film patterns 34A & 34B. According to a first embodiment, the high molecular film patterns 34A & 34B are formed by coating a high molecular film on the lower substrate 30 wherein before the coating, the film is formed by the mixing of a high molecular material and a solvent. The film is then cured, and the cured film is then patterned by a photolithography method using a photoresist film as a mask. According to a second embodiment, a photoinitiator is added to the high molecular film during the synthesis of the high molecular film in order to break the chains connecting each molecule of the conductive high molecular film when irradiating ultraviolet ray for the formation of the high molecular film pattern. In the latter embodiment, the addition of the photoinitiator makes use of photoresist mask pattern unnecessary, and thus, the number of process steps in the formation of the high molecular film pattern is decreased.

FIGS. 5A to 5D are partial sectional views showing a process for fabricating the lower glass substrate according to another embodiment of the present invention.

Figure 5A:
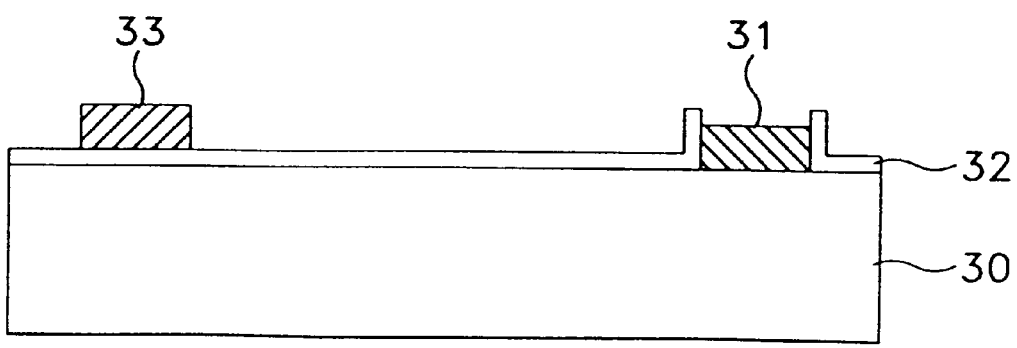
FIGS. 5A to 5D are partial sectional views showing the steps for forming a lower glass substrate according to a second embodiment of the present invention.
Figure 5B:
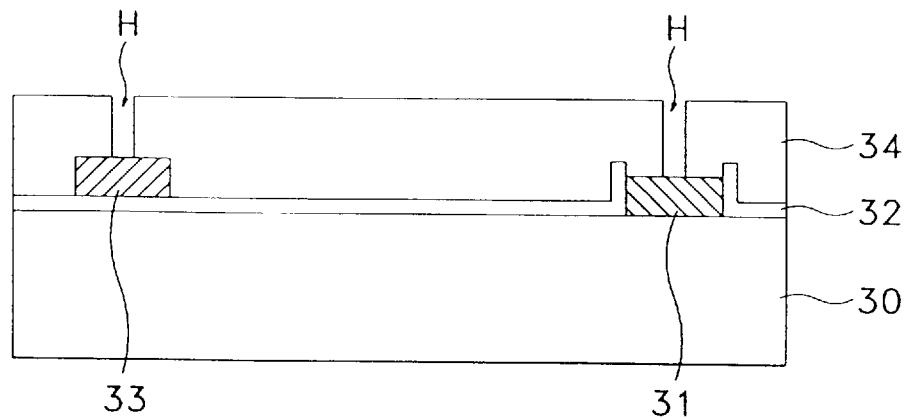
Figure 5C:
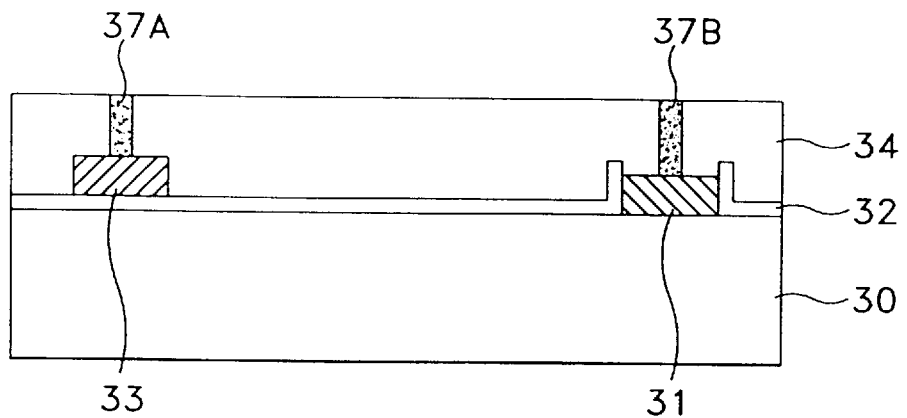
Figure 5D:
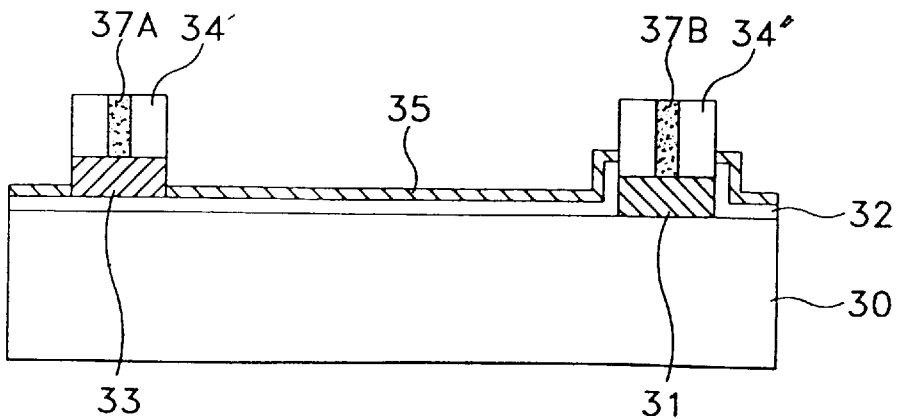

First, with reference to FIG. 5D, indium tin oxides (ITO) 37A and 37B are respectively provided in the core portion of high molecular film patterns 34' and 34". In the first embodiment shown in FIG. 4, the film 34A and 34B must be a conductor, while in this embodiment, the film 34' and 34" may or may not be a conductor. Although in a case where a high molecular film with nonconductivity is used, ITO 37A and 37B at the core portion thereof are electrically connected with the counter electrode 31 and the pixel electrode 33, respectively, therebelow so that a horizontal electric field having the straight component of a sufficient intensity is generated. Meanwhile, a structure having the pixel electrode and the counter electrode as high as the high molecular film, makes it possible to generate the horizontal electric field of a sufficient intensity, but the structure has difficulty in forming a pattern, compared to the structure wherein the high molecular film is applied.

With reference to FIGS. 5A to 5D, a method for fabricating the lower substrate of liquid crystal display device having the above-mentioned structure, will be described.

Referring to FIG. 5A, a gate electrode(not shown) and a counter electrode 31 are first formed on a lower glass substrate 30, and an insulating layer 32 is then formed on a whole surface including the counter electrode 31 and the gate electrode. Afterwards, a pixel electrode 33 is formed on a selected portion of the insulating layer 32. Thereafter, the insulating layer 32 existing on the counter electrode 31 is removed.

Referring to FIG. 5B, a photosensitive high molecular film 34 to which a photoinitiator is added, is then formed on the whole surface. Afterwards, the photosensitive high molecular film 34A at a predetermined portion on the pixel electrode 33 and the counter electrode 31, is exposed and then developed to form a hole H.

Referring to FIG. 5C, ITO material 37A and 37B are filled in the holes H to form an electrical contact with the counter electrode 33 and the pixel electrode 31, respectively. A material with conductivity can be used instead of ITO material. Thereafter, the photosensitive high molecular film at portions except the upper portion of the counter electrode and the upper portion of the pixel electrode, is removed by exposure to light and by a development process, whereby high molecular walls 34' and 34" remain at both sides of each ITO material as shown in FIG. 5D.

Referring to FIG. 5D, an alignment layer 35 which is aligned by ultraviolet ray, is formed on the insulating layer 32.

According to the foregoing method, the high molecular walls 34' and 34" can be made by simple patterning process since a high molecular film is used wherein a photoinitiator is added.

As described above, according to the present invention, a conductive high molecular film pattern is formed on the counter electrode and the pixel electrode of the lower substrate of LCD. The high molecular film pattern minimizes the interference between the individual pixels and the data line, and allows the parallel electric field component for controlling alignment of the liquid crystal molecules in the total cell gap. As a result, the transmittance of LCD device is highly enhanced, and the consumption of electric power of LCD decreases.

Although the present invention has been particularly described with reference to liquid crystal material having negative dielectric anisotropy, it is obvious that the present invention can be applied to a liquid crystal material having positive dielectric anisotropy. In addition, while the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A liquid crystal display device wherein a counter electrode and a pixel electrode are formed on a transparent insulating substrate, comprising:
    a first transparent insulating substrate having a conductive high molecular film formed on the pixel electrode and counter electrode, preventing the fringe field in the in-plane switching mode;
    a second transparent insulating substrate arranged parallel to the first transparent insulating substrate; and
    a liquid crystal material disposed between the first and second transparent insulating substrates, for selectively transmitting light in response to a prescribed input.

2. The liquid crystal display device as claimed in claim 1, wherein said high molecular film comprises a material selected from a group consisting of polyacetylene, polyaniline, p-phenylene, polypyrrole, polythiophene and p-phenylenevinylene.

3. The liquid crystal display device as claimed in claim 2, wherein said high molecular film further comprises a photoinitiator.

4. The liquid crystal display device as claimed in claim 1, wherein said high molecular film has a thickness equal to or less than a cell gap.

5. A liquid crystal display device wherein a counter electrode and a pixel electrode are formed on a transparent insulating substrate, comprising:
    a first transparent insulating substrate having (a) a high molecular film formed on the pixel electrode and the counter electrode, preventing the fringe field in the in-plane switching mode, (b) a conductor inserted in said high molecular films, the conductor being electrically contacted with said pixel electrode and said counter electrode, and having the same height as said high molecular film, and an alignment film formed on said substrate between said counter electrode and said pixel electrode;
    a second transparent insulating substrate arranged parallel to the first transparent insulating substrate; and
    a liquid crystal material disposed between the first and second transparent insulating substrates, for selectively transmitting light in response to a prescribed input.

6. The liquid crystal display device as claimed in claim 5, wherein said high molecular film further comprises a photoinitiator.

7. The liquid crystal display device as claimed in claim 5, wherein said high molecular film is a photosensitive insulator.

8. The liquid crystal display device as claimed in claim 5, wherein said high molecular film is a photosensitive conductor.

9. The liquid crystal display device as claimed in claim 5, wherein said high molecular film has a thickness equal to or less than a cell gap.

10. The liquid crystal display device as claimed in claim 5, wherein said conductor is indium tin oxide.

11. A method for fabricating a liquid crystal display device, the method comprising the steps of:

providing a transparent insulating substrate;

forming a counter electrode pattern and a gate electrode pattern on the transparent substrate;

forming a first conductive high molecular film on the counter electrode pattern, preventing the fringe field in the in-plane switching mode;

forming a insulating layer on the whole surface of the substrate;

forming a pixel electrode pattern on a selected portion of the insulating layer;

forming a second conductive high molecular film on the pixel electrode pattern, preventing the fringe field in the in-plane switching mode; and forming an alignment layer on the whole surface of the substrate.

12. The method as claimed in claim 11, wherein said step for forming said first conductive high molecular film and said second conductive high molecular film, each comprises the steps of:

coating a film on the whole surface of the substrate, the film comprising a conductive high molecular material mixed with a solvent;

curing the film;

forming a photoresist mask pattern on portions of the film over the counter electrode and the pixel electrode;

removing exposed portions of the film using said photoresist mask pattern; and removing said photoresist mask pattern.

13. The method as claimed in claim 12, wherein said first and second high molecular films are respectively formed by a chemical synthesis of one or more materials selected from a group consisting of polyacetylene, polyaniline, p-phenylene, polypryrrole, polythiophene and p-phenylenevinylene.

14. The method as claimed in claim 11, wherein said step of forming first and second conductive high molecular films, comprises the steps of:

coating a film on the whole surface of the substrate, the film comprising a conductive high molecular material mixed with a solvent;

curing the film;

irradiating ultraviolet rays on portions of the film over the counter electrode and the pixel electrode; and removing the irradiated portions of the film.

15. The method as claimed in claim 14, wherein said first and second high molecular films are respectively formed by a chemical synthesis of one or more materials selected from a group consisting of polyacetylene, polyaniline, p-phenylene, polypryrrole, polythiophene and p-phenylenevinylene.

16. The method as claimed in claim 11, wherein said high molecular films have a thickness equal to or less than a cell gap.

17. A method for fabricating a liquid crystal display device, the method comprising the steps of:

providing a transparent insulating substrate;

forming a counter electrode pattern and a gate electrode pattern on the transparent substrate;

forming an insulating layer on the whole surface of the transparent substrate;

forming a channel layer on a portion of the insulating layer over the gate electrode pattern;

forming a pixel electrode pattern on a selected portion of the insulating layer;

removing the insulating layer on the counter electrode;

forming conductive high molecular film patterns on the pixel electrode pattern and the counter electrode pattern, preventing the fringe field in the in-plane switching mode; and forming an alignment layer on the whole surface of the substrate.

18. The method as claimed in claim 17, wherein said step of forming conductive high molecular film patterns, comprises the steps of:

coating a film on the whole surface of the substrate, the film comprising a conductive high molecular material mixed with a solvent;

curing the film;

forming a photoresist mask pattern on portions of film over the counter electrode and the pixel electrode;

removing exposed portions of the film using said photoresist mask pattern; and removing said photoresist mask pattern.

19. The method as claimed in claim 18, wherein said high molecular film patterns are respectively formed by a chemical synthesis of one or more materials selected from a group consisting of polyacetylene, polyaniline, p-phenylene, polypryrrole, polythiophene and p-phenylenevinylene.

20. The method as claimed in claim 17, wherein said step of forming conductive high molecular film patterns, comprises the steps of:

coating a film on the whole surface of the substrate, the film comprising a conductive high molecular material mixed with a solvent;

curing the film;

irradiating ultraviolet ray on portions of film over the counter electrode and the pixel electrode; and removing the irradiated portions of the film.

21. The method as claimed in claim 20, wherein said high molecular film patterns are respectively formed by a chemical synthesis of one or more materials selected from a group consisting of polyacetylene, polyaniline, p-phenylene, polypryrrole, polythiophene and p-phenylenevinylene.

22. The method as claimed in claim 17, wherein said high molecular film patterns have a thickness equal to or less than a cell gap.

23. A method for fabricating a liquid crystal display device, the method comprising the steps of:

providing a transparent insulating substrate;

forming a counter electrode pattern and a gate electrode pattern on the transparent substrate;

forming an insulating layer on the whole surface of the transparent substrate;

forming a channel layer on a portion of the insulating layer over the gate electrode pattern;

forming a pixel electrode pattern on a selected portion of the insulating layer;

removing the insulating layer on the counter electrode;

forming photosensitive high molecular film patterns exposing a core portion of the pixel electrode pattern and a core portion of the counter electrode pattern at a selected height or the whole surface, preventing the fringe field in the in-plane switching mode;

filling the exposed portions with a conductor;

removing said high molecular film at portions except the upper portion of the counter electrode and the upper portion of the pixel electrode; and forming an alignment layer on the whole surface of the substrate.

24. The method as claimed in claim 23, wherein said step of forming said high molecule film, comprises the steps of:

coating a film on the whole surface of the substrate, the film comprising a conductive high molecular material mixed with a solvent;

curing the film;

removing the film by exposure to light and by a development process, except the portions of the film existing on the upper portion of the counter electrode and the upper portion of the pixel electrode.

25. The method as claimed in claim 23, wherein said high molecular film has a thickness equal to or less than a cell gap.

26. The method as claimed in claim 23, further comprising the step of removing the alignment layer on the surface of the high molecular film and the conductor.

27. The method as claimed in claim 23, wherein said conductor is induim tin oxide.

* * * * *

UNITED STATES PATENT AND TRADEMARK OFFICE
CERTIFICATE OF CORRECTION

PATENT NO : 5,959,708
DATED : September 28, 1999
INVENTOR(S) : S. Lee et al

It is certified that error appears in the above-identified patent and that said Letters Patent is hereby corrected as shown below:

At col. 3, line 8, after "possible", please cancel "a".

At col. 8, line 65 (claim 23, line 16), please cancel "or" and substitute --on-- therefor.

Signed and Sealed this

Twenty-seventh Day of June, 2000

Attest:

Q. TODD DICKINSON

Attesting Officer

Director of Patents and Trademarks